United States Patent
Cai et al.

(10) Patent No.: US 11,624,346 B2
(45) Date of Patent: Apr. 11, 2023

(54) ACTIVE RESONANCE C-TYPE BUOYANT FLAP WAVE ENERGY CONVERTER

(71) Applicant: WUHAN UNIVERSITY, Hubei (CN)

(72) Inventors: Yuanqi Cai, Hubei (CN); Yinquan Huo, Hubei (CN); Jianhui Liu, Hubei (CN); Xiangyu Shi, Hubei (CN); Yang Liu, Hubei (CN)

(73) Assignee: WUHAN UNIVERSITY, Wuhan (CN)

( * ) Notice: Subject to any disclaimer, the term of this patent is extended or adjusted under 35 U.S.C. 154(b) by 0 days.

(21) Appl. No.: 17/382,911

(22) Filed: Jul. 22, 2021

(65) Prior Publication Data
US 2021/0355905 A1 Nov. 18, 2021

Related U.S. Application Data

(63) Continuation of application No. PCT/CN2019/127693, filed on Dec. 24, 2019.

(30) Foreign Application Priority Data

Jan. 31, 2019 (CN) .......................... 201910098598.5

(51) Int. Cl.
*F03B 13/18* (2006.01)

(52) U.S. Cl.
CPC ...... *F03B 13/1825* (2013.01); *F05B 2250/44* (2020.08)

(58) Field of Classification Search
CPC .............. F03B 13/1825; F03B 13/182; F05B 2250/44; F05B 2250/72; F05B 2270/202; Y02E 10/30
See application file for complete search history.

(56) References Cited

U.S. PATENT DOCUMENTS 3,928,967 A * 12/1975 Salter .................. F03B 13/1815
60/495
4,580,400 A * 4/1986 Watabe ................ F03B 13/182
417/330

(Continued)

FOREIGN PATENT DOCUMENTS

| CN | 2825347 A1 | 7/2011 |
| CN | 102619669 A | 8/2012 |

(Continued)

OTHER PUBLICATIONS

Xia, Zengyan et al."Research on Theoretical Calculation Method of Natural Frequency of the Pendulum Wave Power Conversion Device." Ocean Technology, vol. 30,No. 1,Mar. 31, 2011, pp. 91and 92.

*Primary Examiner* — Pedro J Cuevas

(57) ABSTRACT

An active resonance C-type buoyant flap wave energy converter includes a rigid frame, a flap, a mass center adjustment assembly and a power generation assembly. The rigid frame is connected to a marine facility, and includes a main body and a support shaft provided at a bottom thereof. The flap is swingingly arranged on the support shaft. The flap is located under water surface, and swings back and forth around the support shaft under an action of a wave. The mass center adjustment assembly is configured to adjust a mass center of the flap to make a natural period of the flap same as a wave period, so as to achieve a resonance between the flap and the wave. The power generation assembly is arranged on the support shaft and is located in the flap.

13 Claims, 9 Drawing Sheets

(56) References Cited

U.S. PATENT DOCUMENTS

| | | | | |
|---|---|---|---|---|
| 8,686,582 B2* | 4/2014 | Gardiner | | F03B 13/20 |
| | | | | 290/53 |
| 9,074,577 B2* | 7/2015 | Dehlsen | | F03B 13/18 |
| 10,094,356 B2* | 10/2018 | Rohrer | | H02K 7/18 |
| 10,788,010 B2* | 9/2020 | Rohrer | | F03B 13/182 |
| 2006/0208494 A1* | 9/2006 | Cook | | F03B 13/20 |
| | | | | 290/53 |
| 2008/0169653 A1* | 7/2008 | Olson | | F03B 13/1815 |
| | | | | 60/398 |
| 2009/0313988 A1 | 12/2009 | Cassagnol et al. | | |
| 2010/0140944 A1* | 6/2010 | Gardiner | | F03B 13/16 |
| | | | | 290/53 |
| 2013/0033039 A1* | 2/2013 | Echenique Gordillo | | |
| | | | | F03B 13/20 |
| | | | | 290/42 |
| 2013/0104538 A1 | 5/2013 | Yuck et al. | | |
| 2014/0265339 A1* | 9/2014 | Dehlsen | | F03B 13/1845 |
| | | | | 60/501 |
| 2015/0013325 A1* | 1/2015 | Dehlsen | | F03B 13/187 |
| | | | | 60/501 |
| 2015/0082785 A1* | 3/2015 | Rohrer | | F03B 13/186 |
| | | | | 60/500 |
| 2015/0252777 A1* | 9/2015 | Rhinefrank | | F03B 13/20 |
| | | | | 290/53 |
| 2019/0040840 A1* | 2/2019 | Rohrer | | F03B 13/1855 |
| 2020/0018281 A1* | 1/2020 | Sincock | | F03B 13/20 |

FOREIGN PATENT DOCUMENTS

| | | |
|---|---|---|
| CN | 105626365 A | 6/2016 |
| CN | 105863939 A | 8/2016 |
| CN | 106438177 A | 2/2017 |
| CN | 109236545 A | 1/2019 |
| EP | 2527641 A1 | 11/2012 |
| EP | 2873852 A1 | 5/2015 |
| FR | 2985549 A1 | 7/2013 |
| KR | 20170001683 U | 5/2017 |

* cited by examiner

ACTIVE RESONANCE C-TYPE BUOYANT FLAP WAVE ENERGY CONVERTER

CROSS-REFERENCE TO RELATED APPLICATIONS

This application is a continuation of International Patent Application No. PCT/CN2019/127693, filed on Dec. 24, 2019, which claims the benefit of priority from Chinese Patent Application No. 201910098598.5, filed on Jan. 31, 2019. The content of the aforementioned applications, including any intervening amendments thereto, is incorporated herein by reference.

TECHNICAL FIELD

This application relates to development and utilization of renewable energy, and more particularly to an active resonance C-type buoyant flap wave energy converter.

BACKGROUND

Wave energy, as a primary component of ocean energy, is a clean and renewable energy, and has attracted extensive attention around the world due to the advantages of easy utilization, large reserves, wide distribution and high energy density. Currently, although some wave energy converters have been subjected to sea trials or demonstrations, the conversion efficiency of the existing technical solutions cannot yet meet the requirements of commercial application. In view of this, it is of great significance to develop new wave energy technologies. Currently, the mainstream wave energy converters include oscillating water column (OWC) wave energy converters, oscillating buoy wave energy converters and oscillating surge wave energy converters (OWSCs).

Among them, the oscillating surge wave energy converter (WEC) has been applied more frequently. The feature of the above OWSCs is that the hinged shafts of the flap are all located below the center of gravity of the flap, and the moment generated by buoyancy is the restoring moment of the OWSCs which is also called buoyant flap. The Oyster wave energy converter developed by Aqua-marine Power Co., Ltd. (Seaford, UK) is a kind of buoyant flap; however, it has not been commercialized yet due to technical reasons, which led to the bankruptcy at the end of 2015. The DUCK wave energy converter proposed by Professor Salter from the University of Edinburgh in 1974 is also a buoyant flap which has been widely studied and subjected to sea trials. Based on the design concept of the DUCK wave energy converter, the Guangzhou Institute of Energy, Chinese Academy of Sciences proposed a sharp eagle wave energy converter, which also pertains to buoyant flap. The Waveroller wave energy converter installed on the shore of the coastal city Peniche of Portugal in 2019 is a buoyant flap proposed by Finland AW-Energy Oy.

The motion law of the buoyant flap is basically the same as that of the water particle in the wave, so that during the operation of the buoyant flap wave energy converter, the stroke of the water particle acting on the flap is longer, and the water particle does more work on the flap, so as to input more wave energy. This law has been extensively applied in the investigation of buoyant flap wave energy converters.

Waves pertain to mechanical wave, and the simplest and most direct method for capturing wave energy is to adopt an oscillating system. The above buoyant flap wave energy converters all capture the wave energy in an oscillating manner. The wave energy conversion system formed by the wave energy converter and water is an oscillating system. When the oscillating system resonates, the wave energy captured by the wave energy converter reaches the largest. However, waves are changeable with time and space, that is, the wave period is different in different time and space. If the wave energy conversion system can achieve resonance with waves, the wave energy conversion efficiency can be enhanced without being affected by the wave period. The technique in which the wave energy conversion is enhanced by resonance between the wave energy device and wave is called resonance wave energy technology (RWET), which is different from the existing wave energy technologies and is considered as a development direction of the wave energy technology in the future. The key of the resonance wave energy technology is how to render resonance of the wave energy conversion system controllable. Phase control technology (PCT) belongs to the RWET, which is aimed at controlling the motion of the wave energy converter to tune with the wave to achieve resonance, and has been widely applied to the oscillating buoy wave energy converters. However, the phase control technology requires real-time prediction of wave force and rapid action, both of which are difficult to achieve. Therefore, there is no practical phase control technology. Controlling the natural frequency of the wave energy conversion system to be consistent with the wave frequency is also a way to achieve resonance, which is called natural frequency control technique (NFCT). Natural frequency control technology has been widely applied to the buoyant flap wave energy converters, such as Solo DUCK and Oyster converters. Although the dynamic characteristics of the wave energy conversion systems can be changed, it still cannot achieve the resonance between the wave energy converter and wave. The main reason is that the top of the proposed wave energy converters pierce the water surface, and the buoyancy and the buoyant centre of the flap are always changing during operation, so that the wave energy system has extremely strong nonlinearity, which leads to strong suppression effect on resonance, making it difficult for the buoyant flap wave energy converter to achieve resonance.

SUMMARY

An object of this application is to provide an active resonance C-type buoyant flap wave energy converter to overcome the defect that the buoyant flap wave energy converters have difficulty in achieving resonance with waves due to strong nonlinearity and large radiation damping.

Technical solutions of this application are described as follows.

This application provides an active resonance C-type buoyant flap wave energy converter, comprising:
 a rigid frame;
 a flap;
 a mass center adjustment assembly; and
 a power generation assembly;
 wherein the rigid frame is connected to a buoy, an offshore platform or a pile tower structure; the rigid frame comprises a main body and a support shaft provided at a bottom of the main body;
 the flap is swingingly arranged on the support shaft; the flap is located below a water surface, and is configured to perform a reciprocating swing around the support shaft under an action of a wave;
 the mass center adjustment assembly is configured to adjust a mass center of the flap to make a natural period of the flap same as a period of the wave, so as to achieve a resonance between the flap and the wave; and the power generation assembly is arranged on the support shaft and is located in the flap; and the power generation assembly is configured to convert the kinetic energy generated by a swing of the flap into an electric energy.

In some embodiments, the mass center adjustment assembly comprises a mass block and a drive assembly; the mass block and the drive assembly are arranged in the flap; and the drive assembly is configured to drive the mass block to rise and fall in a vertical direction, so as to adjust the mass center of the flap.

In some embodiments, the mass center of the flap is adjusted according to the following formula:

$$\omega^2 = (F_f y_f - M_1 g y_1 - M_2 g y_2)/[I_w + I_1 + I_{21} + M_2 y_2^2];$$

wherein $\omega$ is a circular frequency of the wave; $F_f$ is a buoyancy; $y_f$ is a vertical distance from a buoyant centre to a swing axis of the flap; $M_1$ is a mass of the flap; $y_1$ is a vertical distance from the mass center of the flap to the swing axis of the flap; $M_2$ is a mass of the mass block; $y_2$ is a vertical distance from a mass center of the mass block to the swing axis of the flap; $I_w$ is an added moment of inertia of a pitching of the flap; $I_1$ is a moment of inertia of the flap around the swing axis; $I_{21}$ is a moment of inertia of the mass block around the mass center of the mass block; and $I_{21} + M_2 y_2^2$ is a moment of inertia of the mass block around the swing axis of the flap.

In some embodiments, the mass center adjustment assembly comprises two mass center adjustment assemblies; the two mass center adjustment assemblies are arranged in the flap, and are oppositely arranged on two sides of the flap.

In some embodiments, the flap comprises two side surfaces arranged oppositely and a surface toward wave attack and a surface backward wave attack; the surface toward wave attack and the surface backward wave attack are configured to surround the two side surfaces, so as to jointly form a cavity of the flap; each of the two side surfaces comprises a top arc and a bottom arc; the top arc and the bottom arc are connected through a transition curve; and a radius of the top arc is larger than a radius of the bottom arc.

In some embodiments, a circle center of the top arc and a circle center of the bottom arc coincide with the swing axis of the flap; and the transition curve, the top arc and the bottom arc together forms a side profile.

In some embodiments, the top arc, the bottom arc and the transition curve satisfy the following objective functions:

$$\min h = \begin{cases} |x(2cy+d) - y(2ax+b)| / \sqrt{(2ax+b)^2 + (2cy+d)^2} & \varphi - \varphi_1 \leq \beta \leq \varphi + \varphi_2 \\ |v\rho| / \sqrt{v^2 + \rho^2} & \varphi + \varphi_2 \leq \beta \leq \theta - \theta_1 \\ |x(2gy+h) - y(2ex+f)| / \sqrt{(2gy+h)^2 + (2ex+f)^2} & \theta - \theta_1 \leq \beta \leq \theta + \theta_2 \end{cases};$$

wherein h represents a distance from an outer normal line of the transition curve to the swing axis of the flap; $\varphi_1$, $\varphi_2$, $\theta_1$, and $\theta_2$ are design variables; and a, b, c, d, e, f, g and v are parameters; and $\varphi_1$, $\varphi_2$, $\theta_1$, $\theta_2$, a, b, c, d, e, f g and v meet the following conditions:

$$\varphi \in [\pi/6, \pi/3] \varphi_1, \varphi_2 \in [0, \pi/36] \theta \in [\pi/2, \pi] \theta_1, \theta_2 \in [0, \pi/36]$$

$$x^2 + y^2 = R^2 (0 \leq \beta \leq \varphi - \varphi_1)$$

$$ax^2 + bx + cy^2 + dy + 1 = 0 (\varphi - \varphi_1 \leq \beta \leq \varphi + \varphi_2)$$

$$\rho = r + v\beta(\varphi + \varphi_2 \leq \beta \leq \theta - \theta_1)$$

$$v = (R-r)/(\pi - \varphi - \theta)$$

$$ex^2 + fx + gy^2 + hy + 1 = 0 (\theta - \theta_1 \leq \beta \leq \theta + \theta_2)$$

$$x^2 + y^2 = r^2 (\theta + \theta_2 \leq \beta \leq \pi)$$

$$x_1 = R \sin(\varphi - \varphi_1)$$

$$y_1 = =R \cos(\varphi - \varphi_1)$$

$$ax_1^2 + bx_1 + cy_1^2 + dy_1 + 1 = 0$$

$$x_1/y_1 = (2ax_1 + b)/(2cy_1 + d)$$

$$x_2 = \rho(\varphi + \varphi_1) \sin(\varphi + \varphi_1)$$

$$y_2 = \rho(\varphi + \varphi_1) \cos(\varphi + \varphi_1)$$

$$ax_2^2 + bx_2 + cy_2^2 + dy_2 + 1 = 0$$

$$-(2ax_2 + b)/(2cy_2 + d) = [v \sin(\varphi + \varphi_2) + x_2]/[v \cos(\varphi + \varphi_2) - y_2]$$

$$x_3 = \rho(\theta - \theta_1) \sin(\theta - \theta_1)$$

$$y_3 = \rho(\theta - \theta_1) \cos(\theta - \theta_1)$$

$$ex_3^2 + fx_3 + gy_3^2 + hy_3 + 1 = 0$$

$$-(2ex_3 + f)/(2gy_3 + h) = [v \sin(\theta - \theta_1) + x_3]/[v \cos(\theta - \theta_1) - y_3]$$

$$x_4 = r \sin(\theta + \theta_2)$$

$$y_4 = r \cos(\theta + \theta_2)$$

$$ex_4^2 + fx_4 + gy_4^2 + hy_4 + 1 = 0$$

$$x_4/y_4 = (2ex_4 + f)/(2gy_4 + 1);$$

wherein R is the radius of the top arc; r is the radius of the bottom arc; x and y are x-axis and y-axis of a rectangular coordinate system, respectively; $x_1$ and $y_1$ represents x-coordinate and y-coordinate of a first point on the side profile, respectively; $x_2$ and $y_2$ represent x-coordinate and y-coordinate of a second point on the side profile, respectively; $x_3$ and $y_3$ represent x-coordinate and y-coordinate of a third point on the side profile, respectively; and $x_4$ and $y_4$ represent x-coordinate and y-coordinate of a fourth point on the side profile, respectively.

In some embodiments, half of a side surface of the flap is in a "C" shape; a width of the side surface of the flap decreases from top to bottom; and the swing axis of the flap is close to a bottom of the side surface of the flap.

In some embodiments, a bottom of the flap is convex or concave.

In some embodiments, the power generation assembly comprises two power generation assemblies; and the two power generation assemblies are arranged oppositely on two sides inside the flap.

In some embodiments, the active resonance C-type buoyant flap wave energy converter further comprises a support platform; and the rigid frame is arranged on the support platform.

In some embodiments, the active resonance C-type buoyant flap wave energy converter further comprises a lifting-lowering assembly arranged on the support platform; the lifting-lowering assembly is configured to drive the flap to rise and fall to adjust a submerged depth of the flap in water, so as to obtain an optimal capture energy of the flap.

In some embodiments, the active resonance C-type buoyant flap wave energy converter further comprises a yaw assembly arranged on the support platform; the yaw assembly is configured to drive the flap to rotate to adjust a direction of the flap, so as to make the flap directly faces an incoming wave.

The beneficial effects of this application are described as follows.

The flap is not prone to being affected by the wave period and can resonate with the waves encountered, thereby improving the power generation efficiency of the active resonance C-type buoyant flap wave energy converter.

The flap has a profile with excellent radiation hydrodynamic characteristics, which can guarantee that the wave force acting on the flap is large enough, and make the radiation damping of the flap small, thereby enhancing the wave absorbing ability of the flap and weakening the nonlinearity caused by the fluid-structure interaction.

The power generation assembly has a simple structure, which can effectively reduce the electromechanical damping, improving the wave absorbing ability of the flap and enhancing the reliability of the system.

The connection between the flap and the rigid frame can be sealed by the sealing assembly, so that the various components in the flap are isolated from seawater, effectively improve the anti-corrosion performance of the wave energy converter.

The flap is operated completely below the water surface, which can not only attenuate the nonlinearity of the flap to realize the accurate control of the natural period of the flap, but also improve the anti-wind and wave performance of the flap.

BRIEF DESCRIPTION OF THE DRAWINGS

In order to more clearly explain the technical solutions of embodiments of the present application, the accompanying drawings used in the embodiments will be briefly described below. Obviously, presented in the drawings are only some embodiments of the present application. For those of ordinary skill in the art, other drawings can be obtained based on the accompanying drawings provided herein without paying any creative efforts.

Figure 1:
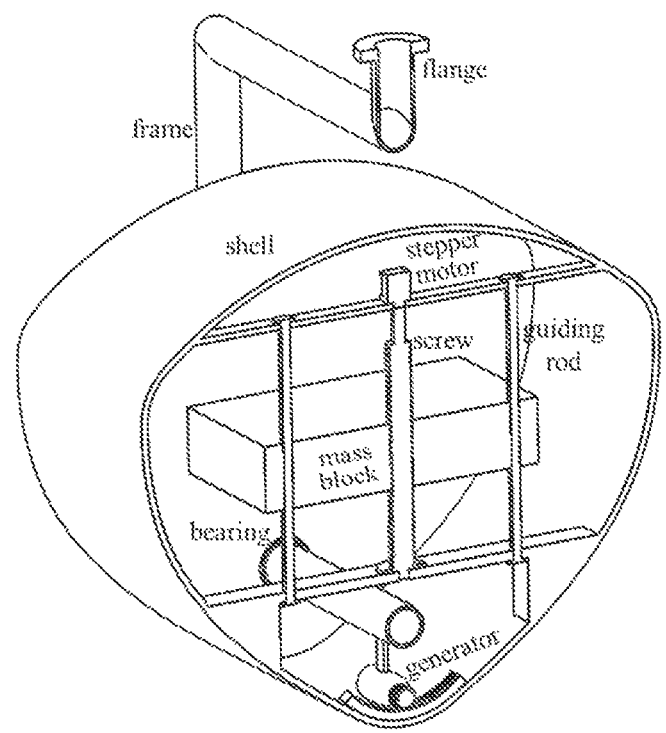
FIG. 1 is a principal diagram of an active resonance C-type buoyant flap wave energy converter according to an embodiment of the disclosure.

In the drawings: 10, active resonance C-type buoyant flap wave energy converter; 1, support platform; 2, lifting-lowering assembly; 3, yaw assembly; 4, rigid frame; 41, support shaft; 5, sealing assembly; 6, flap; 61, side surface; 62, surface toward wave attack; 63, surface backward wave attack; 7, mass center adjustment assembly; 71, mass block; 711, first through hole; 712, second through hole; 713, avoidance groove; 714, accommodating groove; 72, screw rod; 73, drive wheel; 74, driven wheel; 75, motor; 76, guiding rod; 77, load-bearing platform; 771, third through hole; 772, fourth through hole; 8, power generation assembly; 81, inner gear ring; 82, generator gear; 83, speed-increasing gear; and 84, generator.

DETAILED DESCRIPTION OF EMBODIMENTS

The technical solutions of the disclosure will be further described clearly and completely below with reference to the accompanying drawings and embodiments. It should be understood that these embodiments are merely illustrative of the present disclosure, and are not intended to limit the scope of the present disclosure. Other embodiments obtained by those of ordinary skill in the art based on the content disclosed herein without paying any creative efforts shall fall within the scope of the present disclosure.

Figure 2:
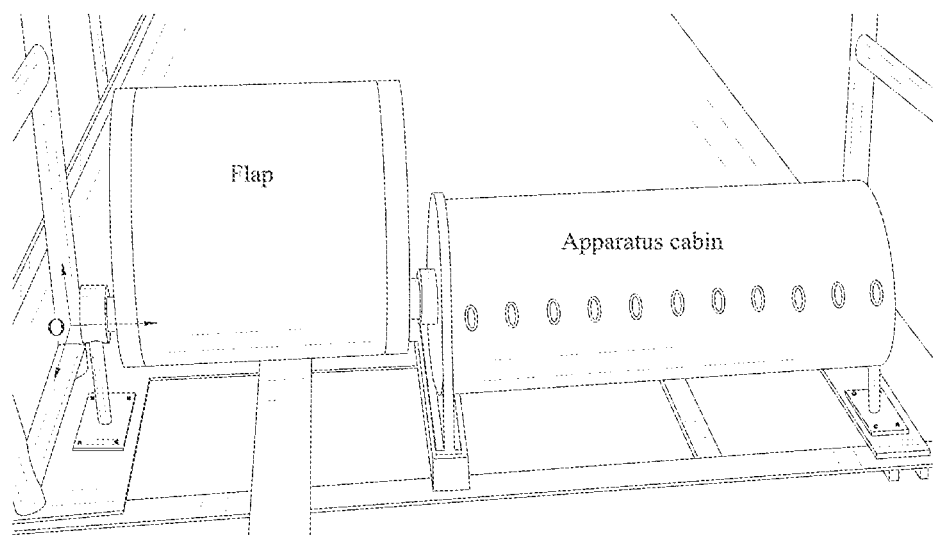
FIG. 2 is a schematic diagram of a prototype of the active resonance C-type buoyant flap wave energy converter according to an embodiment of the disclosure.
Figure 3:
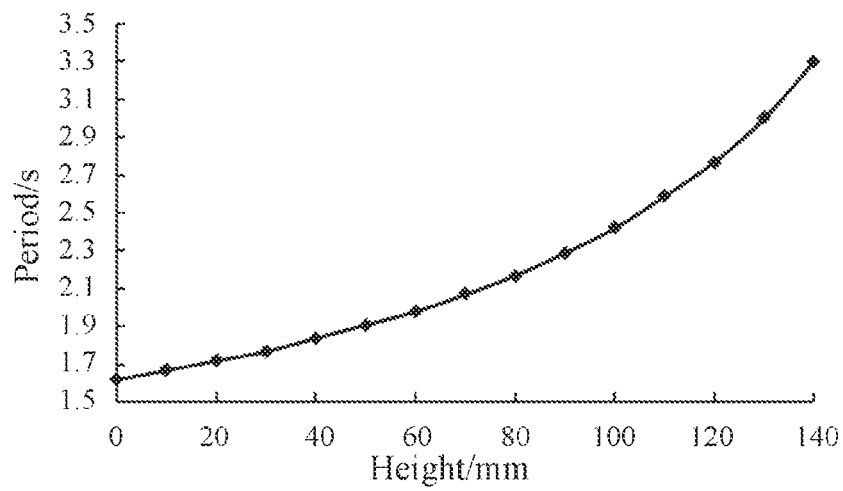
FIG. 3 schematically illustrates a relationship between a natural period of the prototype obtained by a flume test and position of a mass block according to an embodiment of the disclosure.

The key of the resonance wave energy conversion technology is the resonance control of the wave energy converter. The flap returns to the equilibrium position by buoyancy, and the restoring moment of the flap is formed by gravity and buoyancy. If the mass of the flap is fixed during operation, the restoring moment of the flap is only related to the position of the mass center of the flap. Therefore, by controlling the position of the mass center of the flap, the restoring moment of the flap can be controlled, so that the restoring stiffness of the flap can be controlled, achieving the control of the natural period of the flap. In order to achieve the resonance, the flap is required to be submerged in water, which can greatly weaken the nonlinearity of the wave energy conversion system, ensuring the control of the natural period of the wave energy conversion system. Submerging the flap under water is a new strategy that has not been available in the prior art. A mass center adjustment assembly is arranged in the flap, and the mass center of the flap can be controlled by the mass center adjustment assembly, so as to accurately control the natural period of the flap and realize the resonance between the flap and waves. FIG. 1 schematically shows the principle of this application, and the mass center adjustment assembly in the flap is presented in FIG. 1. A prototype of the active resonance C-type buoyant flap wave energy converter provided herein is shown in FIG. 2. The relationship between the natural period obtained by the flume test of the prototype and position of the mass block is shown in FIG. 3, from which it can be seen that the natural period of the prototype can be accurately controlled.

Figure 4:
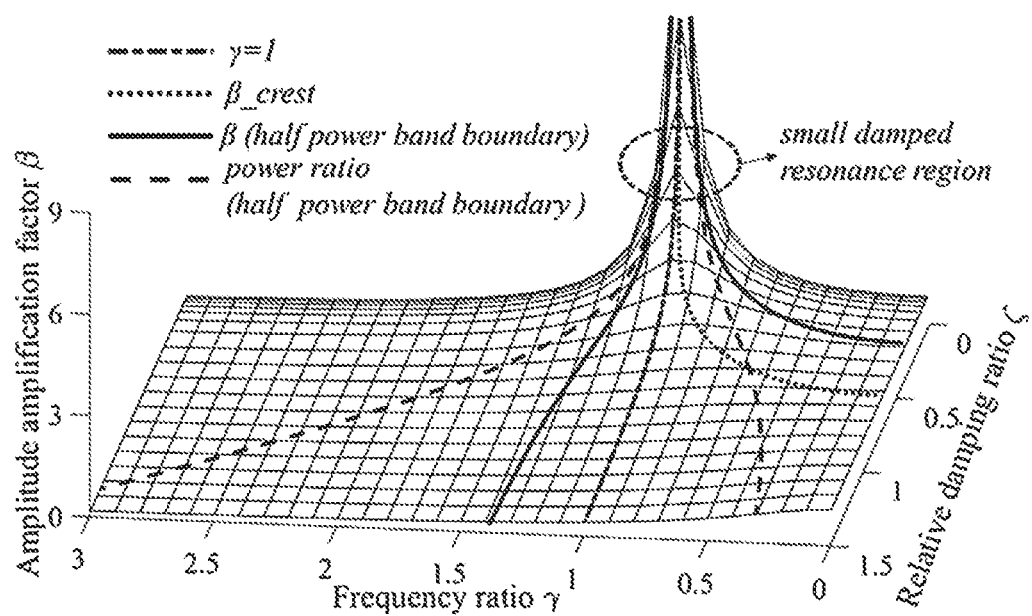
FIG. 4 schematically shows a change of an amplitude amplification factor of an oscillating system with a damping ratio and a frequency ratio according to an embodiment of the disclosure.

It can be demonstrated by researches on the energy absorption of the oscillation system that the energy absorption of the light damping resonance state is much higher than the energy absorption of the large damping resonance state and the non-resonance state. As shown in FIG. 4, the damping has a suppression effect on the energy absorption of the flap. Therefore, in addition to the resonance, it is also required to ensure the system to have light damping to enable the efficient energy absorption of the flap. The damping in the wave energy converter generally includes power take-off (PTO) damping, electromechanical damping and radiation damping. The PTO damping is caused by the power generation of the power generation assembly, and its optimal damping is related to the inherent damping of the system. The electromechanical damping constitutes a part of the inherent damping, which arises from friction and electromagnetic heat loss in the energy conversion system and the power generation assembly. The electromechanical damping can be attenuated by improving manufacturing quality and optimizing the energy conversion system and the power generation assembly. The radiation damping is caused by the energy released during the movement of the flap, which is related to the profile of the flap. The radiation damping of the flap can be greatly reduced by hydrodynamic optimization of the profile of the flap.

The hydrodynamic characteristics of the profile of the flap determine the radiation damping of the flap, the wave force acting on the flap and the nonlinearity caused by the fluid-structure interaction, which will directly affect the wave energy absorption of the wave energy converter.

The radiation damping and wave forces have a great influence on the energy input to the flap. The profile of the flap with large radiation damping suffers a large wave force, and the profile of the flap with low radiation damping suffers a small wave force. The large wave force is beneficial to the input of wave energy, and the large damping will inhibit the energy absorption of the flap. Therefore, effects of the radiation damping caused by the profile of the flap and the wave force acting on the flap on the energy absorption are mutually counteracted. The profile of the flap can be hydrodynamically optimized to attenuate the radiation damping of the flap and increase the wave force acting on the flap, improving the wave energy absorption of the flap. At the same time, by optimizing the profile of the flap, the nonlinearity caused by the fluid-structure interaction can also be reduced, which facilitates relieving the suppression on resonance, facilitating the realization of resonance of the wave energy system.

Figure 5:
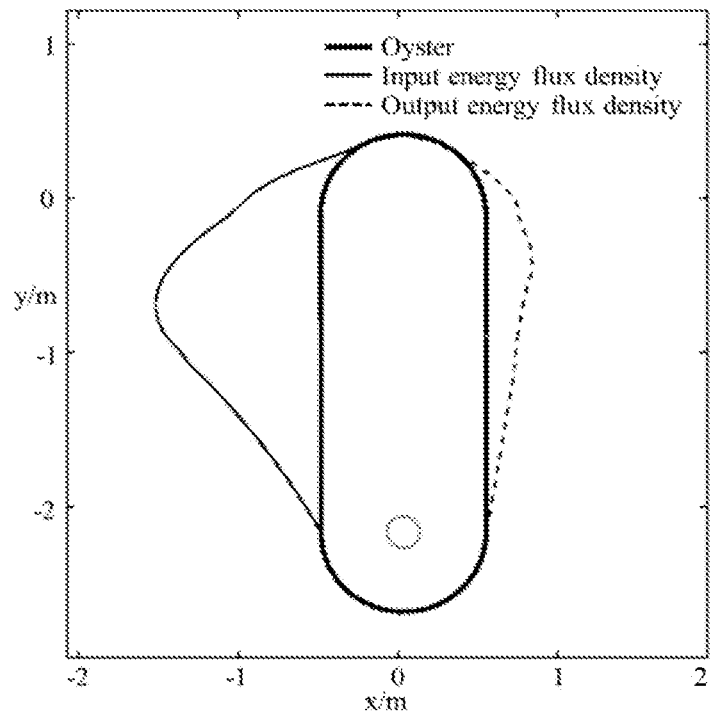
FIG. 5 shows a distribution law of energy flux density on an outer surface of Oyster.
Figure 6:
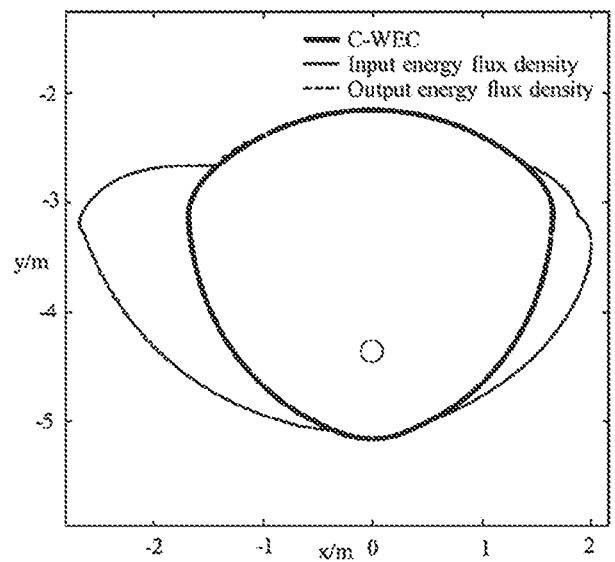
FIG. 6 shows a distribution law of energy flux density on an outer surface of the flap according to an embodiment of the disclosure.

The wave force is directly proportional to the volume of the fluid displaced by the flap and the acceleration of the fluid. The wave force can be intensified by increasing the volume of the flap and arranging the flap in areas with high wave energy flux density, facilitating improving the wave energy input of the flap. During operation, incident and radiation occur simultaneously at the same part of WEC surface, and their effects are opposite. When the incident is larger than the radiation, the WEC absorbs energy; otherwise, the WEC releases energy outwardly. The absorption/release energy flux density on the outer surface of the flap reflects the absorption of wave energy and the release of the flap. A classic distribution law of the absorption/release energy flux density on the outer surface of a classic WEC is shown in FIG. 5, from which it can be seen that the absorption energy flux density on the outer surface of the flap is not evenly distributed. The flap has a large absorption energy flux density on the surface toward wave attack, and the surface backward wave attack of the flap release energy outwards. The incident energy flux density at the top and bottom of the flap is small, which may radiate energy outwards. The wave force can be increased by arranging a large-volume flap in a high energy flux density area. According to the energy flux density distribution law on the outer surface of the flap, a low-radiation profile is adopted in the part of the flap with large radiation to ensure that the wave force acting on the flap is large and the radiation damping is small, enhancing the energy absorption efficiency of the flap. FIG. 6 shows a profile of the flap after hydrodynamic optimization. Comparing FIG. 5 and FIG. 6, it can be seen that the surface toward wave attack and the surface backward wave attack of the optimized flap are both in an energy-absorbing state, so the flap with the profile shown in FIG. 6 is more conducive to the wave energy adsorption.

In the profile of the flap shown in FIG. 6, the big end faces upwards and is close to the water surface, which can maximize the volume of the flap. The centroid of the flap is as close as possible to the area with high wave energy density on the water surface to increase the wave force acting on the flap, thereby increasing the input of wave energy. The top and bottom of the flap adopt cylindrical surfaces with the hinged shaft as the axis, and the outer normal of the cylindrical surface passes through the hinged shaft. The direction of the radiation force on the cylindrical surface is collinear with the direction of the outer normal. In this case, the radiation moment generated by the radiation force is zero, and its radiation is the smallest, and accordingly, the wave moment on the cylindrical surface is also zero. In order to arrange the centroid of the flap in the high energy flux density area, the radius of the top cylindrical surface of the flap is much larger than the radius of the bottom cylindrical surface. In view of this, a spiral, evolvent or higher-order curve is used to connect the two cylindrical surfaces. The connection curve is optimized to ensure that the distance between the outer normal of the curve and the hinged shaft is minimum and the enclosed area is maximum. The optimized profile can ensure that the active resonance C-type buoyant flap wave energy converter including the flap has a small radiation damping, and the wave force acting on the flap is large enough to solve the damping and wave force problems of the wave energy converter.

In this application, the wave energy conversion is enhanced based on resonance. Specifically, the mass center of the flap is controlled to enable the control of the natural period of the flap, thereby realizing the resonance between the wave energy system and the waves. According to the relationship between radiation damping and wave force, the method for optimizing the profile of the flap and the optimized profile are given. Under the condition of ensuring the small damping of the wave energy system, the nonlinearity caused by the fluid-structure interaction can also be weakened. The top of the flap is submerged in water to eliminate the nonlinearity caused by the change of the wetted surface of the flap, which provides preconditions for realizing the resonance of the flap and waves. Moreover, this design can effectively resist wind and waves and improve its service life. Based on the above theory, this application proposes an active resonance C-type buoyancy flap wave energy converter.

The regulation method and control model of the natural period of the active resonance C-type buoyancy flap wave energy converter are described as follows.

In the wave energy converter, the flap is an oscillator, that is, the flap oscillator. The position of the mass center of the flap determines the restoring stiffness of the flap, thereby affecting the natural period of the flap oscillator. Therefore, a mass block is provided in the flap to adjust the mass center, and the position of the mass block can be adjusted according to the period of the wave, thereby changing the restoring stiffness of the flap oscillator, realizing the natural period adjustment of the wave energy converter, and enabling the real-time resonance of the wave energy system.

A formula for adjusting the mass center is shown as follows:

$$\omega^2 = (F_f y_f - M_1 g y_1 - M_2 g y_2)/[I_w + I_1 + I_{21} + M_2 y_2^2];$$

where $\omega$ is a wave circular frequency; $F_f$ is a buoyancy of the flap; $y_f$ is a vertical distance from a buoyant centre of the flap to a swing axis of the flap; $M_1$ is a mass of the flap; $y_1$ is a vertical distance from the mass center of the flap to the swing axis of the flap; $M_2$ is a mass of the mass block; $y_2$ is a vertical distance from a mass center of the mass block to the swing axis of the flap; $I_w$ is an added moment of inertia of the pitching of the flap; $I_1$ is a moment of inertia of the flap around the swing axis; $I_{21}$ is a moment of inertia of the mass block around its own mass center; and $I_{21} + M_2 y_2^2$ is a moment of inertia of the mass block around the swing axis of the flap.

An encoder is arranged on the main shaft connected to the flap, and is configured to measure the swing signal of the flap. The swing signal of the flap is obtained by load identification to obtain the wave period and the wave excitation. The natural period of the flap is adjusted in real time according to the obtained wave period, so as to realize the resonance between the flap and the waves. The power generation of the wave energy converter is controlled according to the obtained wave excitation and wave period.

Design of a Profile of the Flap with Large Wave Force and Small Radiation Damping An object of the designing of the active resonance C-type buoyancy flap wave energy converter is to capture the maximum wave energy. Considering that the wave energy inputted into the flap can be effectively increased by enhancing the wave force and attenuating the radiation damping, the volume of the flap should be as large as possible, and the radiation of the flap should be reduced when designing the flap. According to the characteristics of the flap, the profile shown in FIG. 6 is adopted. The large end of the flap faces upwards, so that the top of the flap is located in the area of high energy flux density, and the centroid of the flap is as far away as possible from the hinged shaft. The large radiation is not conducive to the energy absorption of the flap, and also increases the nonlinearity of the flap. The top of the flap adopts a cylindrical surface with the hinged shaft as the axis, which can effectively reduce the radiation at the top of the flap, thereby reducing the radiation damping at the top of the flap and the nonlinearity caused by the fluid-structure interaction. The energy flux density at the bottom of the flap is relatively low, and the radiation energy flux density of the flap is relatively large. The bottom of the flap also adopts a cylindrical surface with the hinged shaft as the axis, so as to reduce the radiation damping at the bottom of the flap and the nonlinearity.

Figure 7:
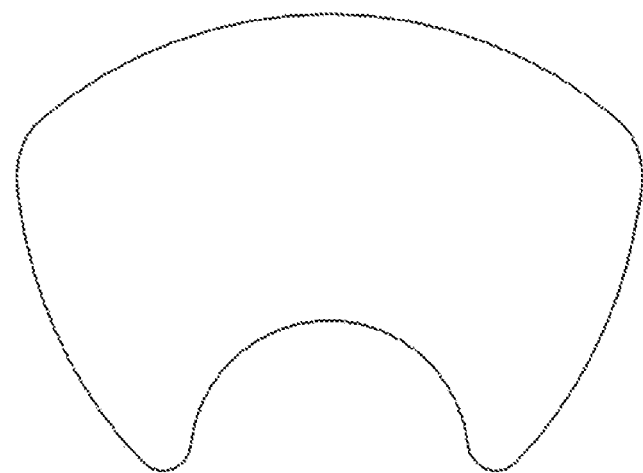
FIG. 7 is a schematic diagram of a bottom of the flap with an upward concave shape according to an embodiment of the disclosure.

There are two arrangements for the cylindrical surface at the bottom of the flap. In a case that the flap is completely located in the area with high energy flux density in the sea area with a long wave period, the bottom of the flap adopts a downward convex cylindrical surface, as shown in FIG. 6. In a case that the bottom of the flap is in a still water or low energy flux density area in the sea area with a short-wave period, the bottom of the flap adopts an upward concave cylindrical surface, as shown in FIG. 7. In order to increase the volume of the flap, the radius of the cylindrical surface at the top of the flap is much larger than the radius of the cylindrical surface at the bottom of the flap. The two cylindrical surfaces are connected by a spiral, evolvent or high-order curve. The connection curve is optimized to ensure that the distance between the outer normal of the curve and the hinged shaft is minimum and the enclosed area is maximum.

Power Generation Assembly

The power generation assembly of the active resonance C-type buoyant flap wave energy converter is arranged in the flap. The flap is driven by the waves to drive an inner gear ring arranged thereon to swing around the hinged shaft, and the inner gear ring drives a generator gear supported on the hinged shaft to rotate. The generator gear drives a generator to generate electric energy. The radius of the inner gear ring is much larger than the radius of the generator gear, which leads to a large transmission ratio, increasing the speed. At the same time, the swing amplitude of the flap in the resonance state is large, which can be used to directly drive the generator to generate electric energy. Different from the current wave energy converter, the wave energy converter provided herein does not require a hydraulic energy conversion system, which can significantly simplify the mechanism of the energy conversion and power generation assemblies, effectively reduce the electromechanical damping and its loss and reduce the damping of the wave energy converter, greatly improving the power generation efficiency of the wave energy converter. Moreover, the reliability of the flap can also be enhanced.

The power generation assembly can also be arranged outside the flap and connected to the flap through a transmission shaft, and the flap drives the transmission shaft to reciprocate. The rotation speed of the generator gear can be increased by the speed-increasing gear, and the generator gear drives the generator to generate electric energy. When an external power generation assembly is used, the flap and the power generation assembly should be relatively fixed by a support.

Operation Form

In order to weaken the strong nonlinearity of the wave energy converter and facilitate realizing the resonance, the flap is completely submerged in water to work to ensure that the buoyancy and buoyant centre of the flap remain unchanged during operation, thereby realizing precise control of the natural period of the flap. The radiation characteristic of the flap is related to the submerged depth, and the height and period of the wave affect the distribution of the wave energy flux density, so that during the operation, the submerged depth of the flap needs to be controlled according to the tide level, wave period and wave height, maximizing the wave energy captured by the flap.

The active resonance C-type buoyant flap wave energy converter of this application is designed based on the resonance wave energy technical theory. In the resonance wave energy technology, the natural period of the flap is actively adjusted to adapt the natural period of the flap to the wave, allowing the wave energy converter to be in a resonance state. By optimizing the profile of the flap, the radiation damping of the flap can be reduced and the wave force acting on the flap can be increased. Meanwhile, the nonlinearity of the flap can be reduced to enable that the wave energy converter can absorb energy under conditions of large wave force and low radiation. According to the characteristics of the flap, a mass center adjustment assembly is provided to adjust the position of the mass center of the flap, so as to change the restoring stiffness of the flap. The control of the natural period of the flap is realized to make the natural period of the flap consistent with the wave period, so that the real-time resonance of the wave energy conversion system can be realized. The top of the flap adopts a large-diameter cylinder, and the bottom of the flap adopts a small-diameter cylinder. The large and small cylinders are connected by a spiral line or a high-order fitting curve, and the objective function of the connection line is controlled to minimize the distance between the outer normal of the curved surface and the axis of the main shaft, which can effectively improve the wave force, reduce the radiation damping of the flap and improve the nonlinearity of the flap, thereby ensuring the wave absorption efficiency of the flap. The flap is arranged under the water surface, which can effectively reduce the nonlinearity of the flap, accurately controlling the natural period of the flap, enhancing the anti-wind and anti-wave performances of the flap and expanding the area toward wave attack. Based on that the flap in resonance has large swing amplitude, the flap can be used to directly drive the generator to generate electric energy, which can simplify the mechanism of the energy conversion and power generation assemblies, reducing the electromechanical damping and improving the reliability of the flap.

Figure 8:
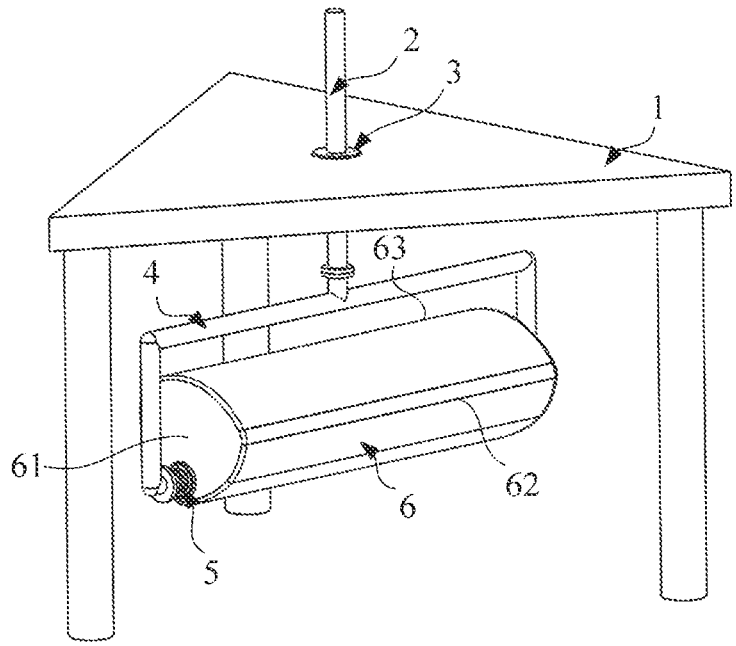
FIG. 8 is a schematic diagram of the active resonance C-type buoyant flap wave energy converter according to an embodiment of the disclosure.
Figure 9:
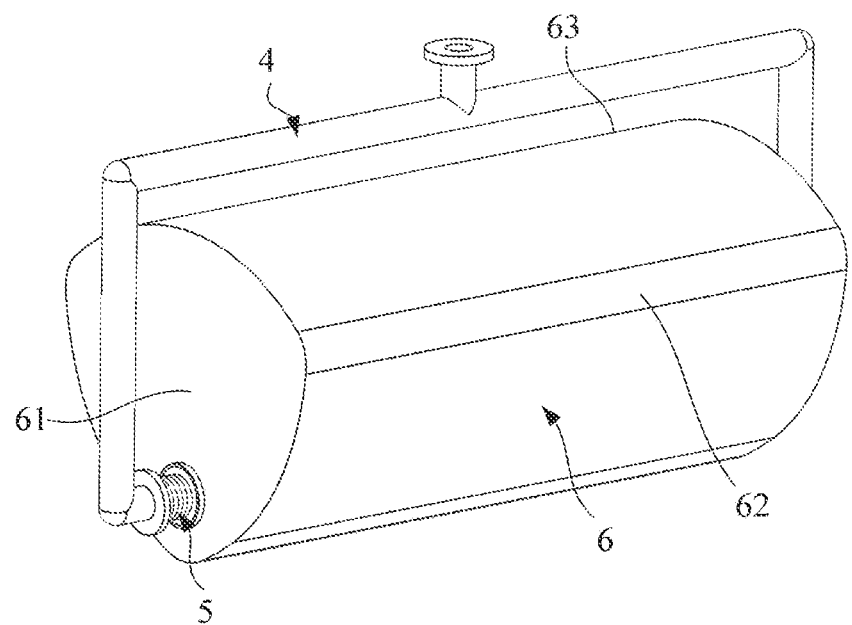
FIG. 9 is a schematic diagram of the flap and a rigid flame according to an embodiment of the disclosure.

As shown in FIGS. 8 and 9, this application provides an active resonance C-type buoyant flap wave energy converter 10, which includes a support platform 1, a lifting-lowering assembly 2, a yaw assembly 3, a rigid frame 4, a sealing assembly 5, a flap 6, and a mass center adjustment assembly 7 and a power generation assembly 8 arranged in the flap 6. The support platform 1 is configured to place the flap 6 and a power transmission and transformation equipment. Besides, the flap 6 is connected to buoy, an offshore platform or a pile tower structure through the rigid frame 4. The flap 6 is supported by a support shaft 41 arranged at a lower end of the rigid frame 4, and the rigid frame 4 is arranged under the support frame 1. The rigid frame 4 is connected to the support platform 1 through the lifting-lowering assembly 2 and the yaw assembly 3. The yaw assembly 3 is arranged on the support platform 1. The yaw assembly 3 can drive the flap 6 to swing through the rigid frame 4, so as to make the flap 6 faces the incoming waves. The lifting-lowering assembly 2 is arranged on the support platform 1, and the lifting-lowering assembly 2 can drive the flap 6 to rise and fall through the rigid frame 4 to control the submerged depth of the flap 6, so as to realize the optimal capture energy of the flap 6. The lifting-lowering assembly 2 and the rigid frame 4 are both composed of round pipes to form a pipe gallery. The cables in the flap 6 can be led out to the support platform 1 through the pipe gallery. The maintenance personnel can enter the flap 6 through the pipe gallery for maintenance. There is a relative swing motion between the flap 6 and the support shaft 41 at the lower end of the rigid frame 4, and the flap 6 is located below the water surface and needs to be sealed by the sealing assembly 5.

As shown in FIG. 9, the flap 6 includes two side surfaces 61 arranged oppositely and a surface toward wave attack 62 and a surface backward wave attack 63; the surface toward wave attack 62 and the surface backward wave attack 63 are configured to surround the two side surfaces 61, so as to jointly form a cavity of the flap 6. Each of the two side surfaces comprises a top arc and a bottom arc, and the top arc and the bottom arc are connected through a transition curve. A radius of the top arc is larger than a radius of the bottom arc. According to the wave information of the installation sea area, a profile between the two side surfaces 61 is a shape after hydrodynamic optimization as shown in FIG. 6 or FIG. 7. The two side surfaces 61 of the flap 6 and the support shaft 41 are connected by bearings, and the flap 6 swings relative to the support shaft 41 during power generation.

Figure 10:
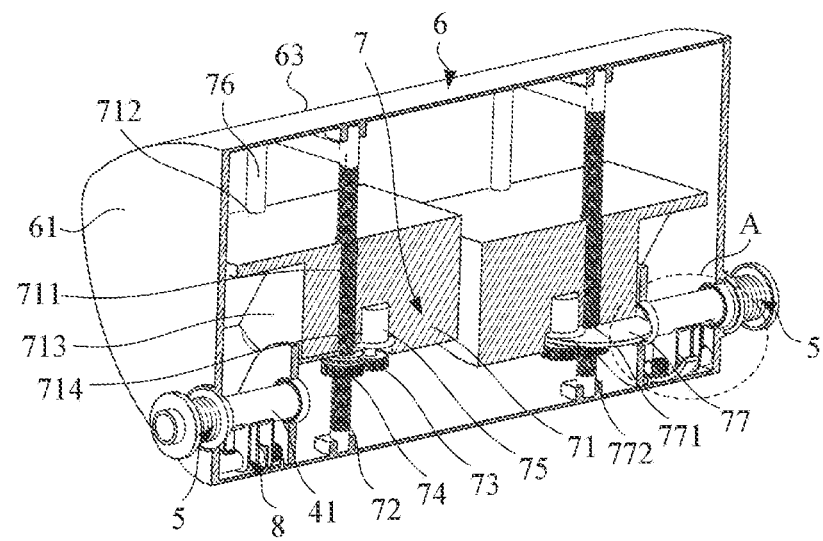
FIG. 10 schematically shows the bottom of the flap with a downward convex shape according to an embodiment of the disclosure.

As shown in FIG. 10, the mass center adjustment assembly 7 includes a mass block 71, a screw rod 72, a drive wheel 73, a driven wheel 74, a motor 75, a guiding rod 76 and a load-bearing platform 77 arranged in the flap 6. The screw rod 72 is vertically arranged in the flap 6, and the motor 75 is arranged on the mass block 71. The drive wheel 73 is sheathed on an output shaft of the motor 75, and the driven wheel 74 is sheathed on the screw rod 72. The drive wheel 73 and the driven wheel 74 are engaged with each other. The mass block 71 includes a first through hole 711. The mass block 71 is sheathed on the screw rod 72 through the first through hole 711, and is located above the driven wheel 74. The mass block 71 further includes a second through hole 712, and the mass block 71 is sheathed on the guiding rod 76 through the second through hole 712. The guiding rod 76 is vertically arranged in the flap 6. The load-bearing platform 77 is provided with a third through hole 771 and a fourth through hole 772. The load-bearing platform 77 is sheathed on the screw rod 72 through the third through hole 771, and is located between the driven wheel 74 and the mass block 71. The load-bearing platform 77 passes through the output shaft of the motor 75 through the fourth through hole 772, and is connected to a main body of the motor 75. The motor 75 drives the drive wheel 73 to rotate, and the drive wheel 73 drives the driven wheel 74 to rotate. The driven wheel 74 drives the load-bearing platform 77 to rise and fall along the screw rod 72, so that the load-bearing platform 77 drives the mass block 71 to rise and fall along the screw rod 72, thereby changing the position of the mass center of the flap 6 to realize the adjustment of the natural period of the active resonance C-type buoyant flap wave energy converter 10, and controlling the occurrence of resonance between the flap 6 and the wave.

As shown in FIG. 10, the mass center adjustment assembly 7 includes two mass center adjustment assemblies 7, and the two mass center adjustment assemblies 7 are arranged oppositely on two sides inside the flap 6.

An accommodating groove 714 is provided on the mass block 71, and the main body of the motor 75 is arranged in the accommodating groove 714. With this arrangement, the range in which the motor 75 drives the mass block 71 rise and fall along the screw rod 72 can be increased, so that the mass center of the flap 6 has a larger adjustment range. The power generation assembly 8 is arranged in the flap 6 and is adjacent to the side surface 61 of the flap 6. In order to prevent the mass block 71 from colliding with the power generation assembly 8 during the lifting-lowering process, an avoidance groove 713 is provided at a side of the mass block 71 adjacent to the power generation assembly 8. The mass block 71 can avoid the power generation assembly 8 during the lifting-lowering process, thereby improving the reliability of the active resonance C-type buoyant flap wave power converter 10.

The position of the mass center of the flap 6 determines the restoring stiffness of the flap 6, thereby affecting the natural period of the flap oscillator. By setting a mass block 71 with an adjustable mass center in the flap 6, the position of the mass block 71 can be adjusted according to the wave period, thereby changing the restoring stiffness of the flap oscillator, and realizing the adjustment of the natural period of the active resonance C-type buoyant flap wave energy converter 10 and resonance between the flap 6 and the wave.

A formula for adjusting the mass block 71 is shown as follows:

$$\omega^2=(F_f y_f-M_1 g y_1-M_2 g y_2)/[I_w+I_1+I_{21}+M_2 y_2^2];$$

wherein $\omega$ is a circular frequency of the wave; $F_f$ is a buoyancy of the flap; $y_f$ is a vertical distance from a buoyant centre to a swing axis of the flap; $M_1$ is a mass of the flap; $y_1$ is a vertical distance from the mass center of the flap to the swing axis of the flap; $M_2$ is a mass of the mass block; $y_2$ is a vertical distance from a mass center of the mass block to the swing axis of the flap; $I_w$ is an added moment of inertia of the pitching of the flap; $I_1$ is a moment of inertia of the flap around the swing axis; $I_{21}$ is a moment of inertia of the mass block around the mass center of the mass block; and $I_{21}+M_2 y_2^2$ is a moment of inertia of the mass block around the swing axis of the flap.

A sensor is provided in the flap 6, and the motion parameters of the flap 6 are monitored by the sensor. Based on the detected swing signal, the wave period and wave excitation force are identified by using a load identification method, which provides a basis for the resonance control of the active resonance C-type buoyant flap wave energy converter 10, thereby adjusting the natural period of the flap oscillator in real time in the case of actual waves, and realizing resonance between the flap 6 and the waves in real time.

Figure 11:
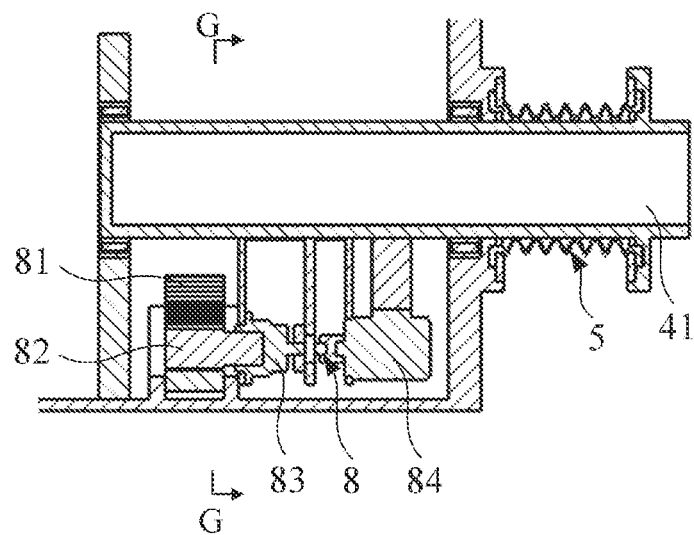
FIG. 11 is a sectional view of part A of FIG. 10.
Figure 12:
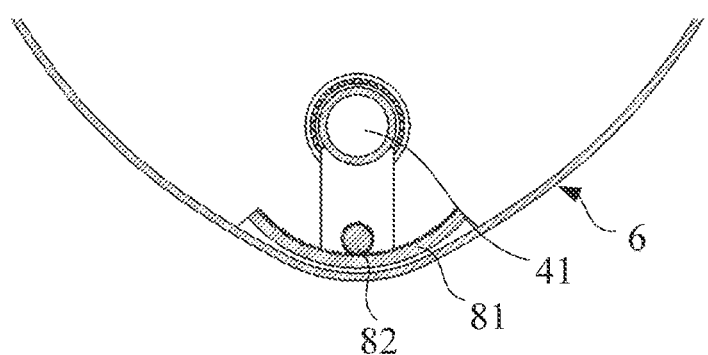
FIG. 12 is a sectional view of part G of FIG. 11.

As shown in FIGS. 10-12, in this application, the active resonance C-type buoyancy flap wave energy converter 10 includes two power generation assemblies 8, which are respectively arranged on two sides inside the flap 6. When the input wave energy is large, two sets of the power generation assemblies 8 are configured to generate electric energy at the same time; when the input wave energy is small, only one power generation assemblies 8 is configured to generate electric energy, so as to reduce the electromechanical damping of the power generation assemblies 8, and improve the power generation efficiency of the active resonance C-type buoyancy flap wave energy converter 10. The power generation assembly 8 includes an inner ring gear 81, a generator gear 82, a speed-increasing gear 83 and a generator 84 located in the flap 6. The inner ring gear 81 is arranged at the bottom of the flap 6, and the generator 84 is arranged on the support shaft 41. The generator gear 82 is engaged with the inner ring gear 81. The generator gear 82 is sheathed on an input shaft of the generator 84, and the speed-increasing gear 83 is arranged between the generator gear 82 and the generator 84. The flap 6 swings back and forth under the action of waves, and the flap 6 drives the inner ring gear 81 to swing back and forth. The inner ring gear 81 drives the generator gear 82 to rotate, so that the generator gear 82 drives the input shaft of the generator 84 to rotate through the speed-increasing gear 83, making the generator 84 generate electric energy.

In order to weaken the strong nonlinearity of the active resonance C-type buoyancy flap wave energy converter 10 and provide conditions for resonance, the flap 6 is completely submerged in water to work to ensure that the buoyancy and the buoyant centre of the flap 6 remain unchanged during operation, thereby realizing the precisely control of the nature period of the flap 6. The radiation characteristics of the flap 6 are related to the submerged depth, and the wave height and wave period affect the wave energy flux density distribution. When the flap 6 is operating, the flap 6 needs to be controlled according to the tide level, wave period and wave height, making the flap 6 capture the maximum energy.

Figure 13:
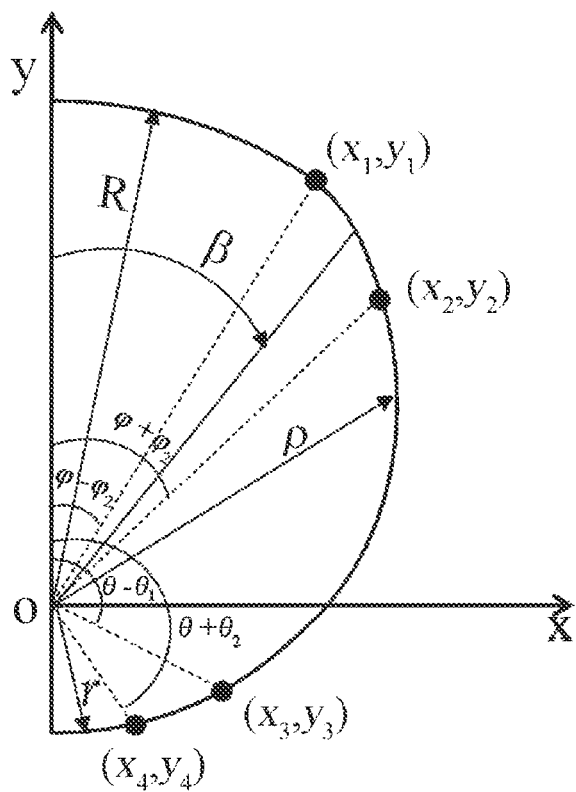
FIG. 13 schematically shows a calculation of an optimization curve of a profile of the flap according to an embodiment of the disclosure.

FIG. 13 schematically shows a calculation of an optimization curve of a profile of the flap. Since the surface toward wave attack 62 and the surface backward wave attack 63 of the flap 6 are symmetrical about the mid-plane, only half of the outline of the flap 6 is shown in FIG. 13. The top and the bottom of the flap 6 adopt cylindrical surfaces with the hinged shaft as the axis, and the outer normal of the cylindrical surface passes through the hinged shaft. The direction of the radiation force on the cylindrical surface is collinear with the direction of the outer normal. Therefore, if the radiation force passes through the hinged axis, the radiation moment generated by the radiation force is zero. The two cylindrical surfaces are connected through a spiral, evolvent or higher-order curve. The connection curve is optimized to ensure that the distance between the outer normal of the curve and the hinged shaft is minimum and the enclosed area is maximum. The optimized profile can ensure that the active resonance C-type buoyant flap wave energy converter 10 formed by the flap 6 has a small radiation damping, and the wave force acting on the flap is large enough to solve the damping and the wave force problems of the active resonance C-type buoyant flap wave energy converter 10. At the same time, the use of the cylindrical surfaces with the hinged shaft as the axis at the top and the bottom of the flap 6 can reduce the nonlinearity caused by the fluid-structure interaction, which is beneficial to realize resonance between the flap and the waves.

As shown in FIG. 13, the top arc, the bottom arc and the transition curve satisfy the following objective functions:

$$\min h = \begin{cases} |x(2cy+d)-y(2ax+b)|\Big/\sqrt{(2ax+b)^2+(2cy+d)^2} & \varphi-\varphi_1 \le \beta \le \varphi+\varphi_2 \\ |v\rho|\Big/\sqrt{v^2+\rho^2} & \varphi+\varphi_2 \le \beta \le \theta-\theta_1 \\ |x(2gy+h)-y(2ex+f)|\Big/\sqrt{(2gy+h)^2+(2ex+f)^2} & \theta-\theta_1 \le \beta \le \theta+\theta_2 \end{cases};$$

wherein h represents a distance from an outer normal line of the transition curve to the swing axis of the flap; $\varphi_1$, $\varphi_2$, $\theta_1$, and $\theta_2$ are design variables; and a, b, c, d, e, f g and v are parameters; and $\varphi_1$, $\varphi_2$, $\theta_1$, $\theta_2$, a, b, c, d, e, f, g and v meet the following conditions:

$\varphi \in [\pi/6, \pi/3] \varphi_1, \varphi_2 \in [0, \pi/36] \theta \in [\pi/2, \pi] \theta_1, \theta_2 \in [0, \pi/36]$ $x^2+y^2=R^2(0 \le \beta \le \varphi-\varphi_1)$ $ax^2+bx+cy^2+dy+1=0(\varphi-\varphi_1 \le \beta \le \varphi+\varphi_2)$ $\rho=r+v\beta(\varphi+\varphi_2 \le \beta \le \theta-\theta_1)$ $v=(R-r)/(\pi-\varphi-\theta)$ $ex^2+fx+gy^2+hy+1=0(\theta-\theta_1 \le \beta \le \theta+\theta_2)$ $x^2+y^2=r^2(\theta+\theta_2 \le \beta \le \pi)$ $x_1=R\sin(\varphi-\varphi_1)$ $y_1==R\cos(\varphi-\varphi_1)$ $ax_1^2+bx_1+cy_1^2+dy_1+1=0$ $x_1/y_1=(2ax_1+b)/(2cy_1+d)$ $x_2=\rho(\varphi+\varphi_1)\sin(\varphi+\varphi_1)$ $y_2=\rho(\varphi+\varphi_1)\cos(\varphi+\varphi_1)$ $ax_2^2+bx_2+cy_2^2+dy_2+1=0$ $-(2ax_2+b)/(2cy_2+d)=[v\sin(\varphi+\varphi_2)+x_2],[v\cos(\varphi+\varphi_2)-y_2]$ $x_3=\rho(\theta-\theta_1)\sin(\theta-\theta_1)$ $y_3=\rho(\theta-\theta_1)\cos(\theta-\theta_1)$ $ex_3^2+fx_3+gy_3^2+hy_3+1=0$ $-(2ex_3+f)/(2gy_3+h)=[v\sin(\theta-\theta_1)+x_3]/[v\cos(\theta-\theta_1)-y_3]$ $x_4=r\sin(\theta+\theta_2)$ $y_4=r\cos(\theta+\theta_2)$ $ex_4^2+fx_4+gy_4^2+hy_4+1=0$ $x_4/y_4=(2ex_4+f)/(2gy_4+1);$ wherein R is the radius of the top arc; r is the radius of the bottom arc; x and y are x-axis and y-axis of a rectangular coordinate system, respectively; $x_1$ and $y_1$ represent x-coordinate and y-coordinate of a first point on the side profile, respectively; $x_2$ and $y_2$ represent x-coordinate and y-coordinate of a second point on the side profile, respectively; $x_3$ and $y_3$ represent x-coordinate and y-coordinate of a third point on the side profile, respectively; and $x_4$ and $y_4$ represent x-coordinate and y-coordinate of a fourth point on the side profile, respectively.

Figure 14:
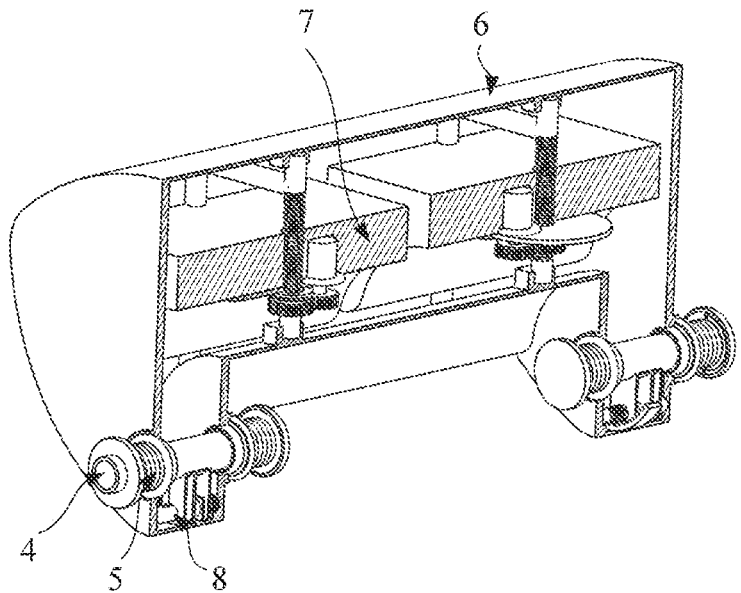
FIG. 14 is another schematic diagram of the bottom of the flap with an upward concave shape according to an embodiment of the disclosure.

The bottom of the flap 6 is convex or concave. As shown in FIG. 10, the bottom of the flap 6 is convex. Specifically, the convex is a downward convex cylindrical surface. As shown in FIG. 14, the bottom of the flap 6 is concave. Specifically, the concave is an upward concave cylindrical surface. In the sea area with a long wave period, the whole flap 6 is in the area with high energy flux density, and the bottom of the flap 6 adopts a downward convex cylindrical surface. In the sea area with a short wave period, the bottom of the flap is in a still water or low energy flux density area, and the bottom of the flap adopts an upward concave cylindrical surface.

Figure 15:
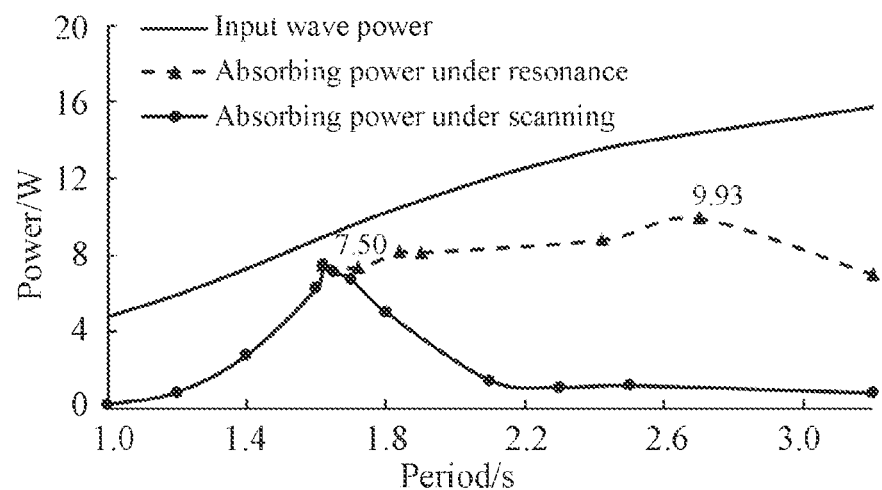
FIG. 15 is a schematic diagram of an absorbed power of the prototype in the flume test according to an embodiment of the disclosure.
Figure 16:
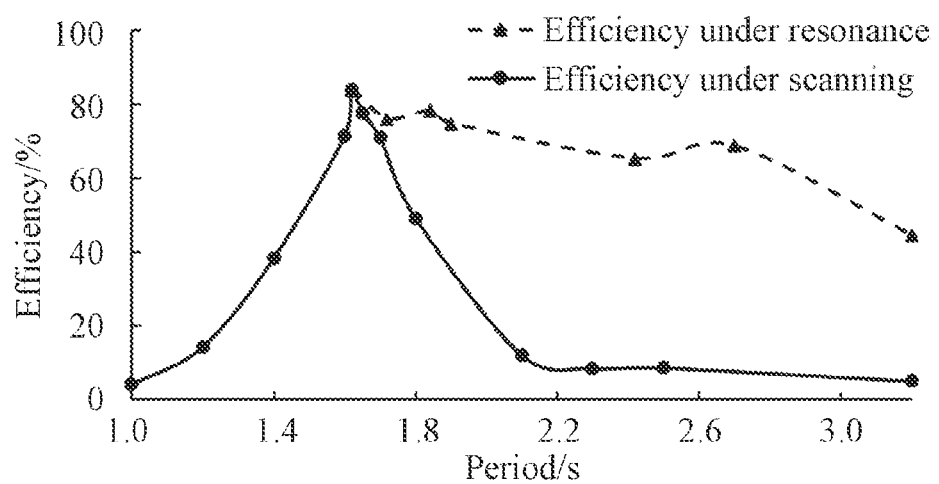
FIG. 16 is a schematic diagram of an absorbed efficiency of the prototype in the flume test according to an embodiment of the disclosure.
Figure 17:
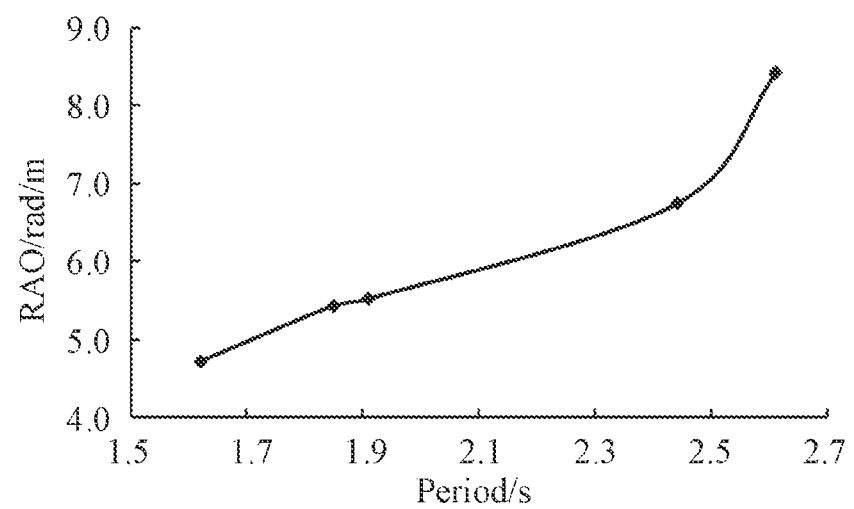
FIG. 17 is a schematic diagram of a response amplitude operator (RAO) of the prototype in the flume test according to an embodiment of the disclosure.

FIG. 2 shows a prototype of this application, through the flume test, the relationship between the natural period of the prototype and the position of the mass block 71 can be tested. As shown in FIG. 3, the test proves that the natural period of the prototype can be accurately controlled. Under the condition that the wave height is 0.01 m, the absorption power of the prototype obtained by the experimental test is shown in FIG. 15. The experiment is divided into two groups. The first group is to fix the natural period of the prototype at 1.62 s and change the wave period to perform the experiment. The prototype in the first group exhibits non-resonant wave energy technology. The natural period of the prototype in second group is consistent with the wave period, that is, resonance can be achieved under different wave periods. Therefore, the prototype in second group exhibits wave energy technology in resonance. Within the same attack wave width, the absorbed wave energy of two sets of the prototype and the input wave energy are compared. It can be seen that the wave energy technology in resonance has obvious advantages over the non-resonant wave energy technology, and the absorbed wave energy of the wave energy technology in resonance is greatly higher than that of the non-resonant wave energy technology. The wave absorbing efficiency of the two sets of experiments is shown in FIG. 16, it can be seen that the wave absorbing efficiency of the active resonance C-type buoyant flap wave energy converter 10 of this application is very high. Under the condition of the maximum power generation of the prototype, the swing angular of the prototype is tested using an average value of the plus and minus maximum swing angle as the swing amplitude, and the RAO obtained by the test is shown in FIG. 17. The swing angle of the prototype of this application is much larger than that of other wave energy converter in the prior art. Therefore, the flap 6 of this application can directly drive the generator 84 to generate electric energy without using hydraulic component, thereby improving the reliability of the active resonance C-type buoyancy flap wave energy converter 10.

The active resonance C-type buoyancy flap wave energy converter 10 has multiple uses, three of which are as follows.

1. Provide Electric Energy for Islands and Coastal Areas

Arranging the active resonance C-type buoyancy flap wave energy converter 10 in sea areas or islands with abundant wave energy resources can provide energy supply for coastal areas and islands and improve their energy structure, especially the islands have rich wave energy resources around them but lack of electric energy resources. The active resonance C-type buoyancy flap wave energy converter 10 can be arranged in an array on the seabed in a designated sea area, and the electric energy generated by the active resonance C-type buoyancy flap wave energy converter 10 is transmitted to the shore through an offshore cable and incorporated into a power grid or a micro-grid.

2. In Combination with a Coastal Dike to Effectively Protect the Seawall by Absorbing Wave Energy to Achieve Wave Absorption The active resonance C-type buoyancy flap wave energy converters 10 are arranged in rows in a sea area which is hundreds of meters away from the shore. The wave energy converters can efficiently absorb wave energy and convert the wave energy into electric energy, and transmit the electric energy to an onshore power grid or a micro-grid through the offshore cable. The wave energy can be effectively reduced after absorbed by the active resonance C-type buoyancy flap wave energy converters 10 to realize wave absorption, so as to reduce the scouring of the embankment caused by the sea waves and improve the safety level of the embankment.

3. Provide Energy for Offshore Exploration, Mining, Aquaculture Instruments

It is more difficult to obtain energy for offshore exploration, mining and aquaculture instruments. The abundant wave energy resources can be converted into electric energy by the active resonance C-type buoyancy flap wave energy converter 10, so as to provide energy for these marine activities. Due to the large depth in the far sea, it is impossible to install wave energy converters by sitting in bed. The active resonance C-type buoyancy flap wave energy converter 10 can be combined with semi-submersible barge technology to realize deep-sea wave energy utilization.

The active resonance C-type buoyancy flap wave energy converter 10 can be placed on a special semi-submersible barge, and is towed to the designated sea area by using a tugboat. The semi-submersible barge in the designated sea area is anchored by using a mooring system, and the electric energy generated by the active resonance C-type buoyancy flap wave energy converter 10 is supplied to the corresponding facilities and equipment.

The above are only the preferred embodiments of the present disclosure, and are not intended to limit the scope of the present disclosure. Any equivalent modifications made by those skilled in the art without departing from the spirit of the present disclosure, or directly/indirectly apply the present disclosure in other related technical fields, shall fall within the scope of the present disclosure.

What is claimed is:

1. An active resonance C-type buoyant flap wave energy converter, comprising:
   a rigid frame;
   a flap;
   a mass center adjustment assembly; and
   a power generation assembly;
   wherein the rigid frame is connected to a buoy, an offshore platform or a pile tower structure; the rigid frame comprises a main body and a support shaft provided at a bottom of the main body;
   the flap is swingingly arranged on the support shaft; the flap is located below a water surface, and is configured to perform a reciprocating swing around the support shaft under an action of a wave;
   the mass center adjustment assembly is configured to adjust a mass center of the flap to make a natural period of the flap same as a period of the wave, so as to achieve a resonance between the flap and the wave; and
   the power generation assembly is arranged on the support shaft and is located in the flap; and the power generation assembly is configured to convert the kinetic energy generated by a swing of the flap into an electric energy.

2. The active resonance C-type buoyant flap wave energy converter of claim 1, wherein the mass center adjustment assembly comprises a mass block and a drive assembly; the mass block and the drive assembly are arranged in the flap; and the drive assembly is configured to drive the mass block to rise and fall in a vertical direction, so as to adjust the mass center of the flap.

3. The active resonance C-type buoyant flap wave energy converter of claim 2, wherein the mass center of the flap is adjusted according to the following formula:

$$\omega^2 = (F_f y_f - M_1 g y_1 - M_2 g y_2)/[I_w + I_1 + I_{21} + M_2 y_2^2];$$

Wherein $\omega$ is a circular frequency of the wave; $F_f$ is a buoyancy; $y_f$ is a vertical distance from a buoyant centre to a swing axis of the flap; $M_1$ is a mass of the flap; $y_1$ is a vertical distance from the mass center of the flap to the swing axis of the flap; $M_2$ is a mass of the mass block; $y_2$ is a vertical distance from a mass center of the mass block to the swing axis of the flap; $I_w$ is an added moment of inertia of a pitching of the flap; $I_1$ is a moment of inertia of the flap around the swing axis of the flap; $I_{21}$ is a moment of inertia of the mass block around the mass center of the mass block; and $I_{21} + M_2 y_2^2$ is a moment of inertia of the mass block around the swing axis of the flap.

4. The active resonance C-type buoyant flap wave energy converter of claim 1, wherein the mass center adjustment assembly comprises two mass center adjustment assemblies; the two mass center adjustment assemblies are arranged in the flap, and are oppositely arranged on two sides of the flap.

5. The active resonance C-type buoyant flap wave energy converter of claim 1, wherein the flap comprises two side surfaces arranged oppositely and a surface toward wave attack and a surface backward wave attack; the surface toward wave attack and the surface backward wave attack are configured to surround the two side surfaces, so as to jointly form a cavity of the flap; each of the two side surfaces comprises a top arc and a bottom arc; the top arc and the bottom arc are connected through a transition curve; and a radius of the top arc is larger than a radius of the bottom arc.

6. The active resonance C-type buoyant flap wave energy converter of claim 5, wherein a circle center of the top arc and a circle center of the bottom arc coincide with the swing axis of the flap; and the transition curve, the top arc and the bottom arc together forms a side profile.

7. The active resonance C-type buoyant flap wave energy converter of claim 6, wherein the top arc, the bottom arc and the transition curve satisfy the following objective functions:

$$\min h = \begin{cases} |x(2cy+d)-y(2ax+b)|\Big/\sqrt{(2ax+b)^2+(2cy+d)^2} & \varphi-\varphi_1 \le \beta \le \varphi+\varphi_2 \\ |v\rho|\Big/\sqrt{v^2+\rho^2} & \varphi+\varphi_2 \le \beta \le \theta-\theta_1 \\ |x(2gy+h)-y(2ex+f)|\Big/\sqrt{(2gy+h)^2+(2ex+f)^2} & \theta-\theta_1 \le \beta \le \theta+\theta_2 \end{cases};$$

wherein h represents a distance from an outer normal line of the transition curve to the swing axis of the flap; $\varphi_1$, $\varphi_2$, $\theta_1$, and $\theta_2$ are design variables; and a, b, c, d, e, f, g and v are parameters; and $\varphi_1$, $\varphi_2$, $\theta_1$, $\theta_2$, a, b, c, d, e, f g and v meet the following conditions:

$\varphi \in [\pi/6, \pi/3] \varphi_1, \varphi_2 \in [0, \pi/36] \theta \in [\pi/2, \pi] \theta_1, \theta_2 \in [0, \pi/36]$ $x^2+y^2=R^2 (0 \le \beta \le \varphi-\varphi_1)$ $ax^2+bx+cy^2+dy+1=0 (\varphi-\varphi_1 \le \beta \le \varphi+\varphi_2)$ $\rho=r+v\beta (\varphi+\varphi_2 \le \beta \le \theta-\theta_1)$ $v=(R-r)/(\pi-\varphi-\theta)$ $ex^2+fx+gy^2+hy+1=0 (\theta-\theta_1 \le \beta \le \theta+\theta_2)$ $x^2+y^2=r^2 (\theta+\theta_2 \le \beta \le \pi)$ $x_1 = R \sin(\varphi-\varphi_1)$ $y_1 = =R \cos(\varphi-\varphi_1)$ $ax_1^2+bx_1+cy_1^2+dy_1+1=0$ $x_1/y_1 = (2ax_1+b)/(2cy_1+d)$ $x_2 = \rho(\varphi+\varphi_1)\sin(\varphi+\varphi_1)$ $y_2 = \rho(\varphi+\varphi_1)\cos(\varphi+\varphi_1)$ $ax_2^2+bx_2+cy_2^2+dy_2+1=0$ $-(2ax_2+b)/(2cy_2+d)=[v\sin(\varphi+\varphi_2)+x_2],[v\cos(\varphi+\varphi_2)-y_2]$ $x_3 = \rho(\theta-\theta_1)\sin(\theta-\theta_1)$ $y_3 = \rho(\theta-\theta_1)\cos(\theta-\theta_1)$ $ex_3^2+fx_3+gy_3^2+hy_3+1=0$ $-(2ex_3+f)/(2gy_3+h)=[v\sin(\theta-\theta_1)+x_3]/[v\cos(\theta-\theta_1)-y_3]$ $x_4 = r \sin(\theta+\theta_2)$ $y_4 = r \cos(\theta+\theta_2)$ $ex_4^2+fx_4+gy_4^2+hy_4+1=0$ $x_4/y_4 = (2ex_4+f)/(2gy_4+1)$;

wherein R is the radius of the top arc; r is the radius of the bottom arc; x and y are x-axis and y-axis of a rectangular coordinate system, respectively; $x_1$ and $y_1$ represents x-coordinate and y-coordinate of a first point on the side profile, respectively; $x_2$ and $y_2$ represent x-coordinate and y-coordinate of a second point on the side profile, respectively; $x_3$ and $y_3$ represent x-coordinate and y-coordinate of a third point on the side profile, respectively; and $x_4$ and $y_4$ represent x-coordinate and y-coordinate of a fourth point on the side profile, respectively.

8. The active resonance C-type buoyant flap wave energy converter of claim 1, wherein half of a side surface of the flap is in a "C" shape; a width of the side surface of the flap decreases from top to bottom; and a swing axis of the flap is close to a bottom of the side surface of the flap.

9. The active resonance C-type buoyant flap wave energy converter of claim 1, wherein a bottom of the flap is convex or concave.

10. The active resonance C-type buoyant flap wave energy converter of claim 1, wherein the power generation assembly comprises two power generation assemblies; and the two power generation assemblies are arranged oppositely on two sides inside the flap.

11. The active resonance C-type buoyant flap wave energy converter of claim 1, further comprising:
a support platform;
wherein the rigid frame is arranged on the support platform.

12. The active resonance C-type buoyant flap wave energy converter of claim 11, further comprising:
a lifting-lowering assembly arranged on the support platform;
wherein the lifting-lowering assembly is configured to drive the flap to rise and fall to adjust a submerged depth of the flap in water, so as to obtain an optimal capture energy of the flap.

13. The active resonance C-type buoyant flap wave energy converter of claim 11, further comprising:
a yaw assembly arranged on the support platform;
wherein the yaw assembly is configured to drive the flap to rotate to adjust a direction of the flap, so as to make the flap directly faces an incoming wave.

* * * * *